United States Patent
Chiba et al.

(10) Patent No.: US 10,430,362 B1
(45) Date of Patent: Oct. 1, 2019

(54) SYSTEM, ELECTRONIC DEVICE, AND CONNECTION CONTROL METHOD

(71) Applicants: KABUSHIKI KAISHA TOSHIBA, Minato-ku, Tokyo (JP); Toshiba Client Solutions CO., LTD., Koto-ku, Tokyo (JP)

(72) Inventors: Hiroaki Chiba, Sagamihara Kanagawa (JP); Koichi Senuma, Ome Tokyo (JP)

(73) Assignees: Kabushiki Kaisha Toshiba, Tokyo (JP); Toshiba Client Solutions Co., Ltd., Tokyo (JP)

( * ) Notice: Subject to any disclaimer, the term of this patent is extended or adjusted under 35 U.S.C. 154(b) by 0 days.

(21) Appl. No.: 16/143,056

(22) Filed: Sep. 26, 2018

(30) Foreign Application Priority Data

Mar. 14, 2018 (JP) .................................. 2018-046916

(51) Int. Cl.
G06F 13/00 (2006.01)
G06F 13/40 (2006.01)
G06F 13/42 (2006.01)
H01R 29/00 (2006.01)

(52) U.S. Cl.
CPC ...... *G06F 13/4022* (2013.01); *G06F 13/4282* (2013.01); *G06F 2213/0042* (2013.01); *H01R 29/00* (2013.01)

(58) Field of Classification Search
None
See application file for complete search history.

(56) References Cited

U.S. PATENT DOCUMENTS

| | | | |
|---|---|---|---|
| 2015/0106544 A1* | 4/2015 | Leinonen | G06F 13/4265 710/313 |
| 2017/0161227 A1* | 6/2017 | Lai | G06F 13/4081 |

FOREIGN PATENT DOCUMENTS

| | | |
|---|---|---|
| JP | 2002-116853 A | 4/2002 |
| JP | 2009-176543 A | 8/2009 |

* cited by examiner

*Primary Examiner* — Henry Tsai
*Assistant Examiner* — Dean Phan
(74) *Attorney, Agent, or Firm* — Knobbe, Martens, Olson & Bear, LLP

(57) ABSTRACT

According to one embodiment, a system includes first and second devices. The first device detects whether a cable is connected to the first device in a first state or a second state. The first device receives, from the second device, status information indicative of whether the cable is connected to the second device in the first state or the second state. The first device switches allocation of signal lines to contact pins of a connector of the first device to which the cable is connected, based on connection states of the first and second devices. The second device detects whether the cable is connected to the second device in the first state or the second state. The second device transmits, to the first device, a result of detection as the status information.

14 Claims, 12 Drawing Sheets

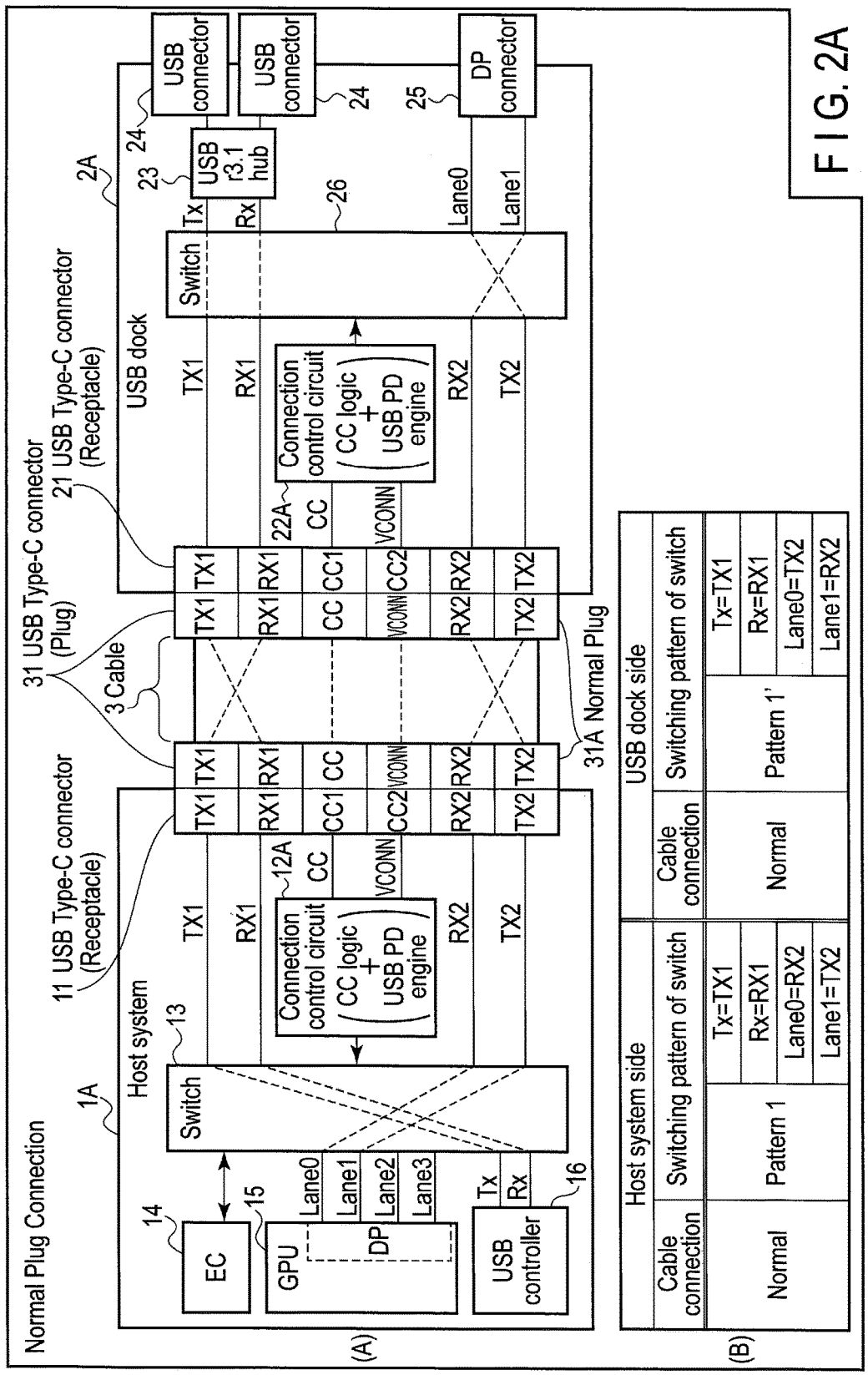
F I G. 2A

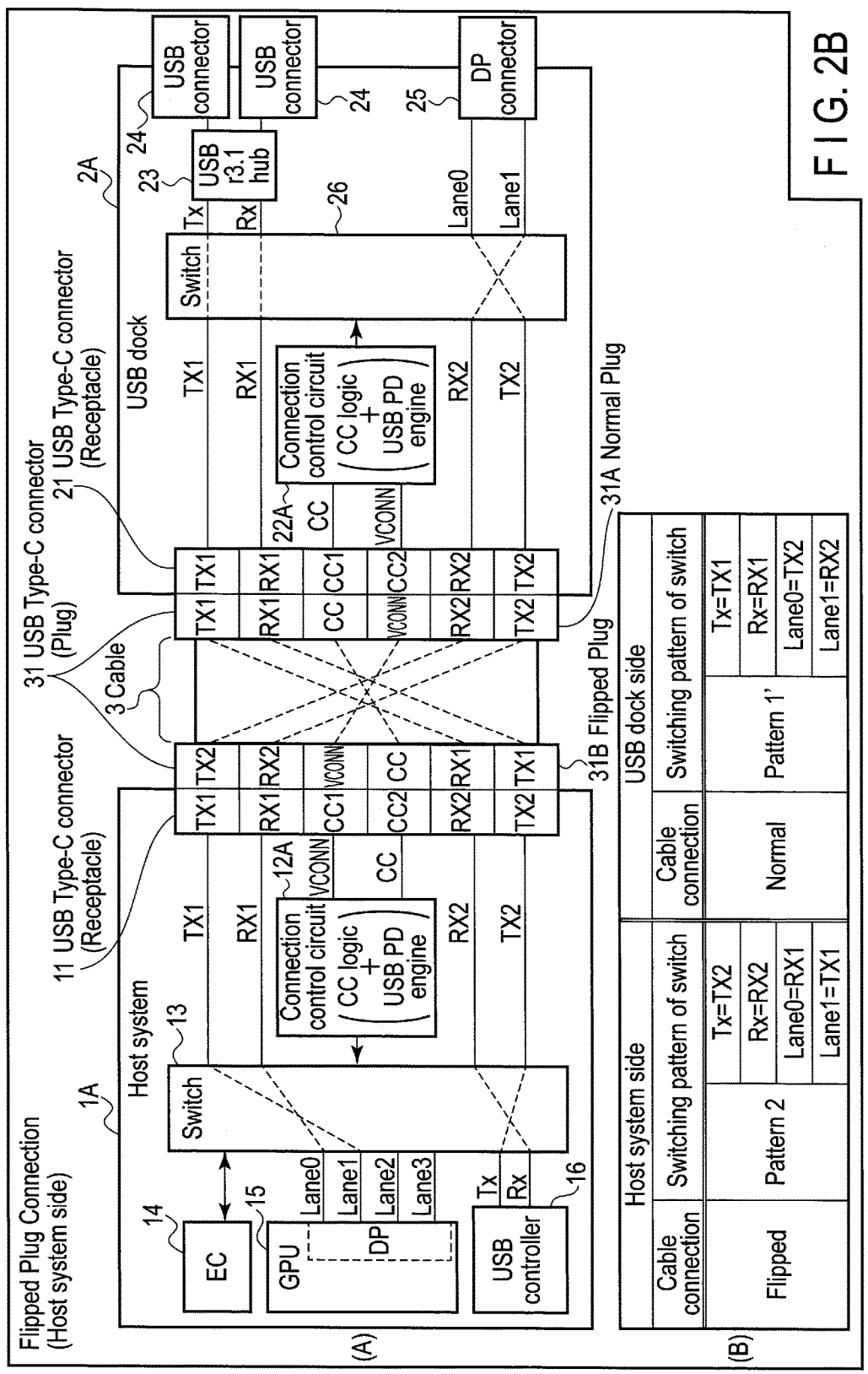
F I G. 2B

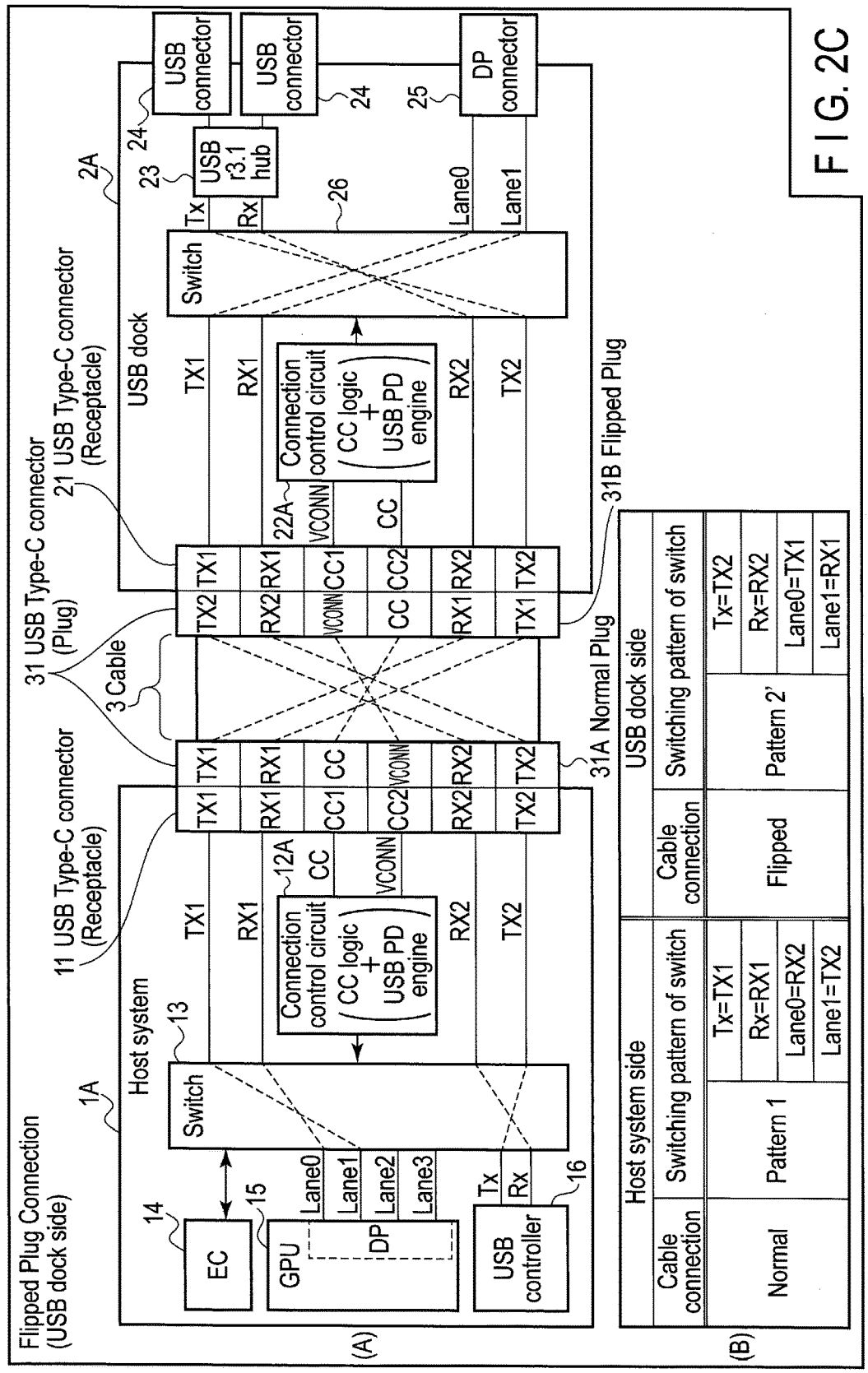
F I G. 2C

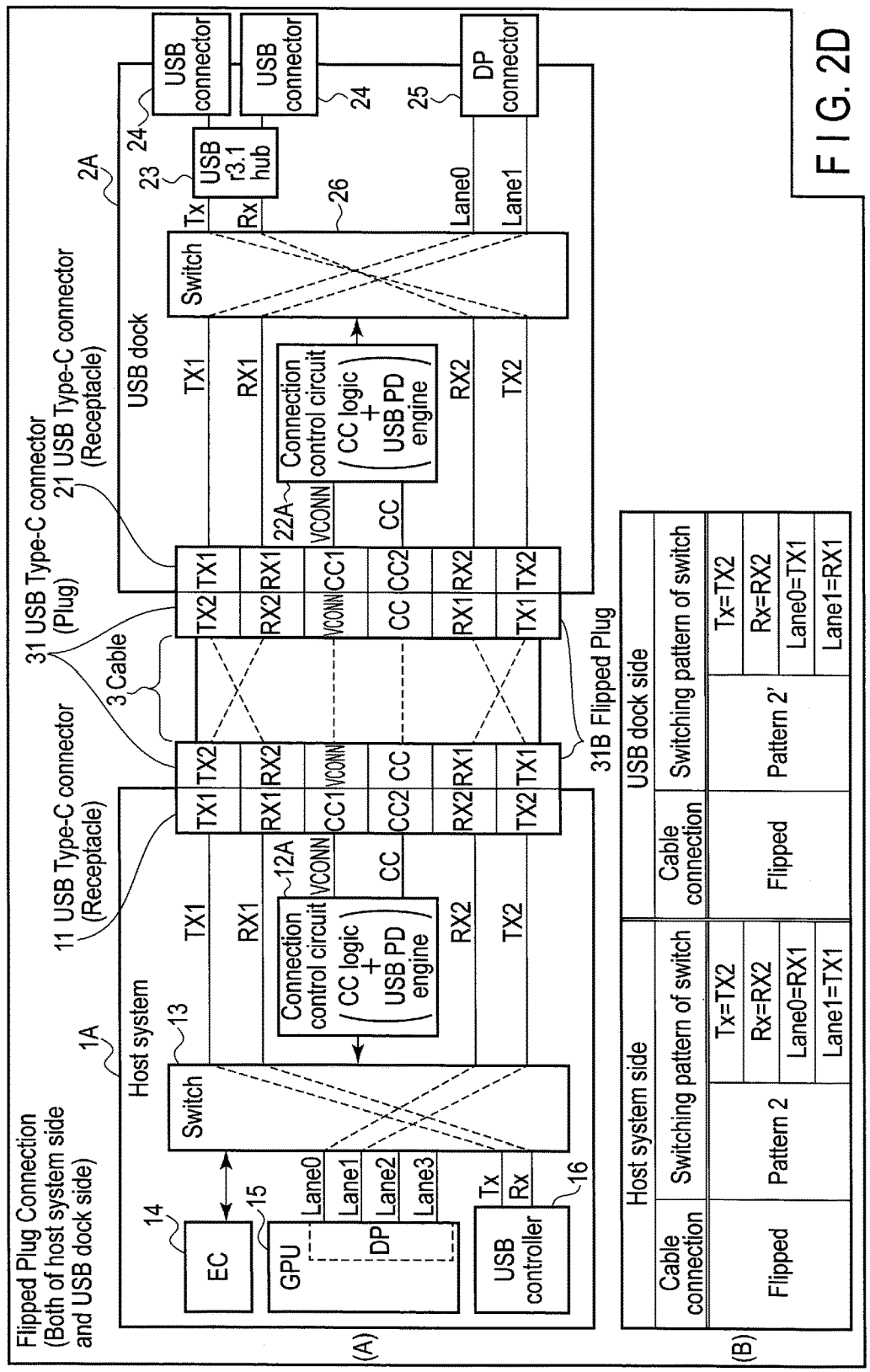
F I G. 2D

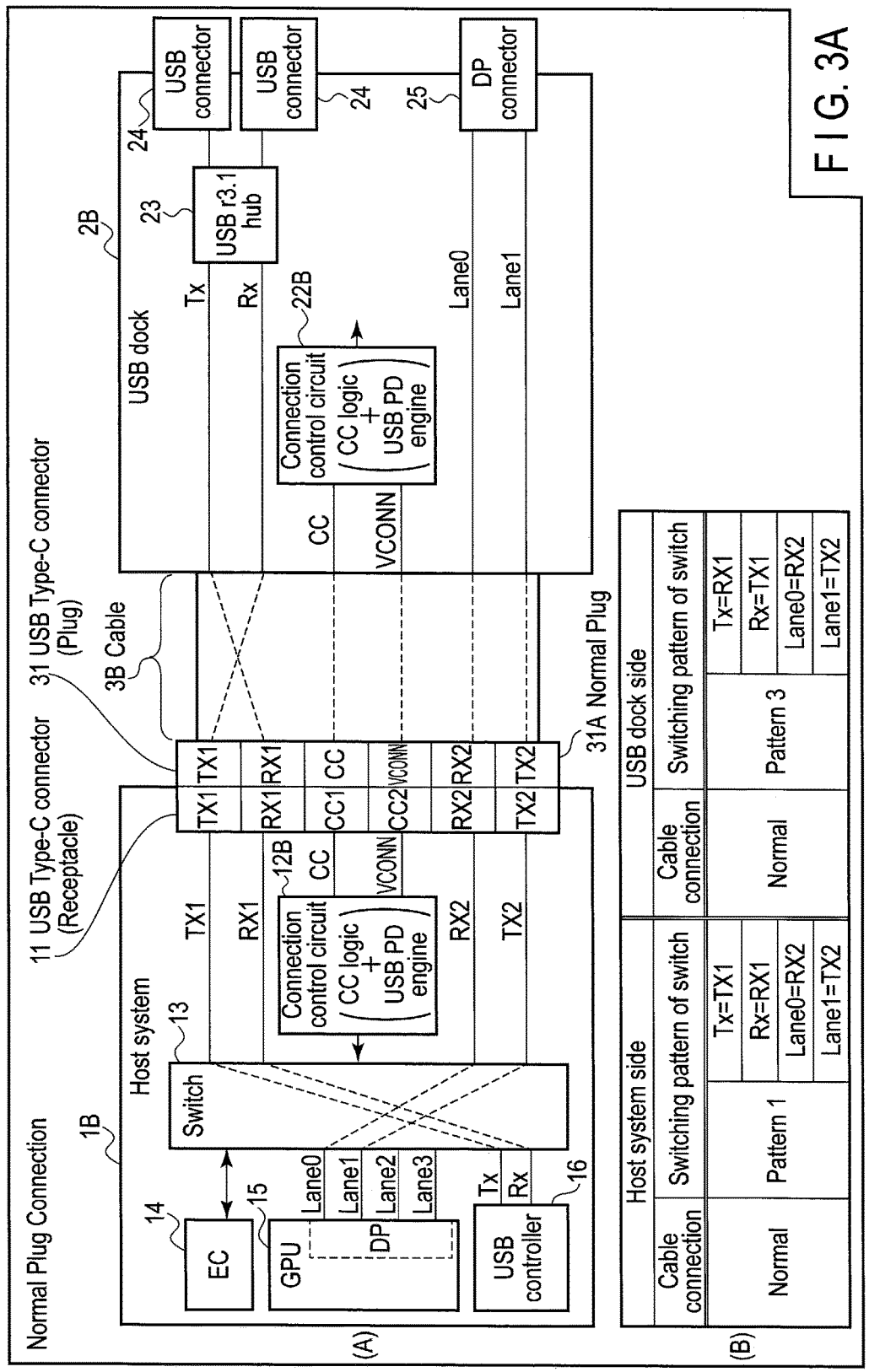
F I G. 3A

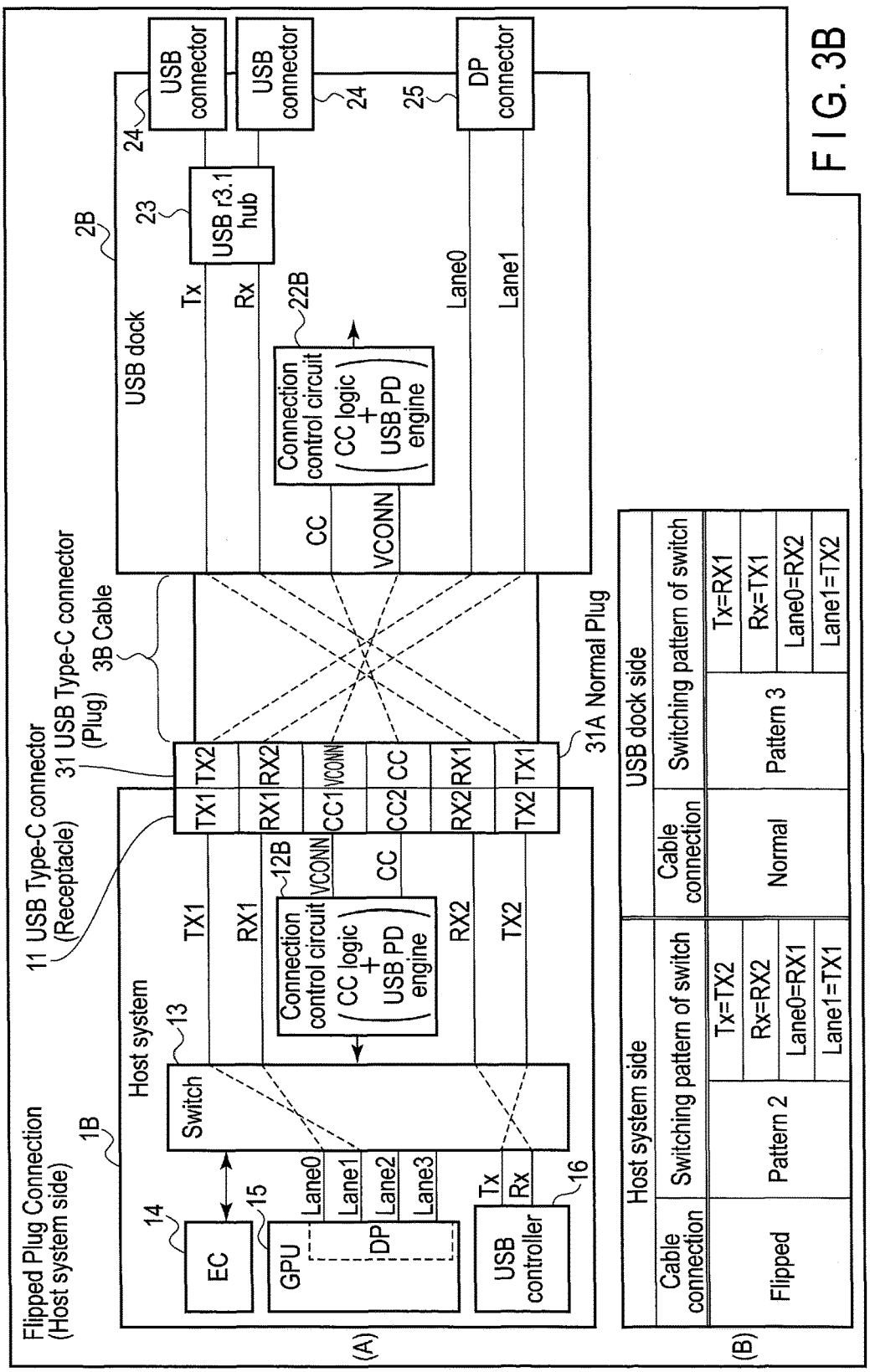
F I G. 3B (A)

| Cable connection | | Switching pattern of switch | | |
|---|---|---|---|---|
| Host system side | USB dock side | Host system side | USB dock side | |
| Normal | Normal | Pattern 1 | Pattern 1' fixed | FIG.1A |
| Flipped | Normal | Pattern 2 | | FIG.1B |
| Normal | Flipped | Pattern 2 | | FIG.1C |
| Flipped | Flipped | Pattern 1 | | FIG.1D |

(B)

| Cable connection | | Switching pattern of switch | | |
|---|---|---|---|---|
| Host system side | USB dock side | Host system side | USB dock side | |
| Normal | Normal | Pattern 1 | Pattern 1' | FIG.2A |
| Flipped | Normal | Pattern 2 | Pattern 1' | FIG.2B |
| Normal | Flipped | Pattern 1 | Pattern 2' | FIG.2C |
| Flipped | Flipped | Pattern 2 | Pattern 2' | FIG.2D |

(C)

| Cable connection | | Switching pattern of switch | | |
|---|---|---|---|---|
| Host system side | USB dock side | Host system side | USB dock side | |
| Normal | Normal | Pattern 1 | Pattern 3 fixed | FIG.3A |
| Flipped | Normal | Pattern 2 | | FIG.3B |

F I G. 4

| Cable connection | | Switching pattern of switch | |
|---|---|---|---|
| Host system side | USB dock side | Host system side | USB dock side |
| Normal | Normal | Pattern 2 | Pattern 2' fixed |
| Flipped | Normal | Pattern 1 | |
| Normal | Flipped | Pattern 1 | |
| Flipped | Flipped | Pattern 2 | |

F I G. 5

SYSTEM, ELECTRONIC DEVICE, AND CONNECTION CONTROL METHOD

CROSS-REFERENCE TO RELATED APPLICATIONS

This application is based upon and claims the benefit of priority from Japanese Patent Application No. 2018-046916, filed Mar. 14, 2018, the entire contents of which are incorporated herein by reference.

FIELD

Embodiments described herein relate generally to a system, an electronic device, and a connection control method.

BACKGROUND

In recent years, various electronic devices such as notebook PCs (personal computers), tablet PCs, and smartphones have become widespread. Generally, the electronic devices of the above type comprise an interface function for transmitting and receiving data to and from external devices. As one of interface standards, the universal serial bus (USB) standard is known.

In the USB Type-C devices implemented according to the USB standard, a connector (a plug) of a cable can be inserted into a connector (a receptacle) of the electronic device in whichever orientation of regular (normal) and reverse (flipped). In other words, in a Type-C connector, a connection surface of the connector (arrangement of contact pins) has a shape of point symmetry, which is referred to as symmetry or a reversible configuration. More specifically, the connection surface has such a shape that the contact pins are arranged symmetrical with respect to a central point of the connection surface in a longitudinal direction.

When two electronic devices are connected via a cable conforming to the USB Type-C standard, these two electronic devices must each comprise a mechanism for enabling data transmission and reception without a problem in whichever orientation of normal and flipped the Type-C connector (plug) of the cable is inserted into the USB Type-C connector (receptacle) of the corresponding device. More specifically, the electronic device must be equipped with a switch that switches allocation of signal lines to the contact pins of the Type-C connector (receptacle). Accordingly, in order to enable an extension unit, which is referred to as a dock, for example, to be connected to a body apparatus by a cable conforming to the USB Type-C standard, the aforementioned switch must also be incorporated in the extension unit. In other words, the demerits were caused in terms of the cost and layout.

Meanwhile, if the extension unit is structured in such a way that a USB Type-C connector (receptacle) is not provided, and a cable is connected directly and fixedly, mounting the aforementioned switch is not required. However, the convenience and safety may be impaired.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2A is a first diagram (Normal-Normal) showing an example of a structure regarding connection by a cable conforming to the USB Type-C standard in a first comparative example.

FIG. 2B is a second diagram (Flipped-Normal) showing an example of a structure regarding connection by a cable conforming to the USB Type-C standard in the first comparative example.

FIG. 2C is a third diagram (Normal-Flipped) showing an example of a structure regarding connection by a cable conforming to the USB Type-C standard in the first comparative example.

FIG. 2D is a fourth diagram (Flipped-Flipped) showing an example of a structure regarding connection by a cable conforming to the USB Type-C standard in the first comparative example.

FIG. 3A is a first diagram (Normal) showing an example of a structure regarding connection by a cable conforming to the USB Type-C standard in a second comparative example.

FIG. 3B is a second diagram (Flipped) showing an example of a structure regarding connection by a cable conforming to the USB Type-C standard in the second comparative example.

FIG. 4 is a diagram showing, as a list, switching patterns of switches in each of the system of the embodiment, the first comparative example, and the second comparative example.

FIG. 5 is a table showing the switching patterns of the switch when allocation of signal lines to contact pins at a USB dock side in the system of the embodiment is changed.

DETAILED DESCRIPTION

Various embodiments will be described hereinafter with reference to the accompanying drawings.

In general, according to one embodiment, a system includes a first device and a second device which are mutually connectable via a cable comprising first connectors at first and second ends of the cable. Each of the first connectors includes a connection surface of a point-symmetrical configuration. Each of the first device and the second device includes a second connector. Each of the first connectors is connectable to the second connector in a first state or a second state in which a first connector is reversed in a longitudinal direction of the connection surface from the first state. The first device includes a switch, a first detector, a receiver and a controller. The switch switches allocation of signal lines to contact pins of the second connector. The first detector detects whether the first connector at the first end is connected to the second connector of the first device in the first state or the second state. The receiver receives, from the second device via the cable, status information indicative of whether the first connector at the second end is connected to the second connector of the second device in the first state or the second state. The controller controls the switch, based on a connection state of the first connector at the first end with respect to the second connector of the first device detected by the first detector, and a connection state of the first connector at the second end with respect to the second connector of the second device indicated by the status information that is received by the receiver. The second device includes a second detector and a transmitter. The second detector detects whether the first connector at the second end is connected to the second connector of the second device in the first state or the second state. The transmitter transmits, to the first device via the cable, a result of detection by the second detector as the status information.

FIGS. 1A to 1D (FIG. 1A, FIG. 1B, FIG. 1C, and FIG. 1D) are diagrams showing examples of a structure regarding connection by a cable conforming to the USB Type-C standard in a system of the present embodiment.

Figure 1A:
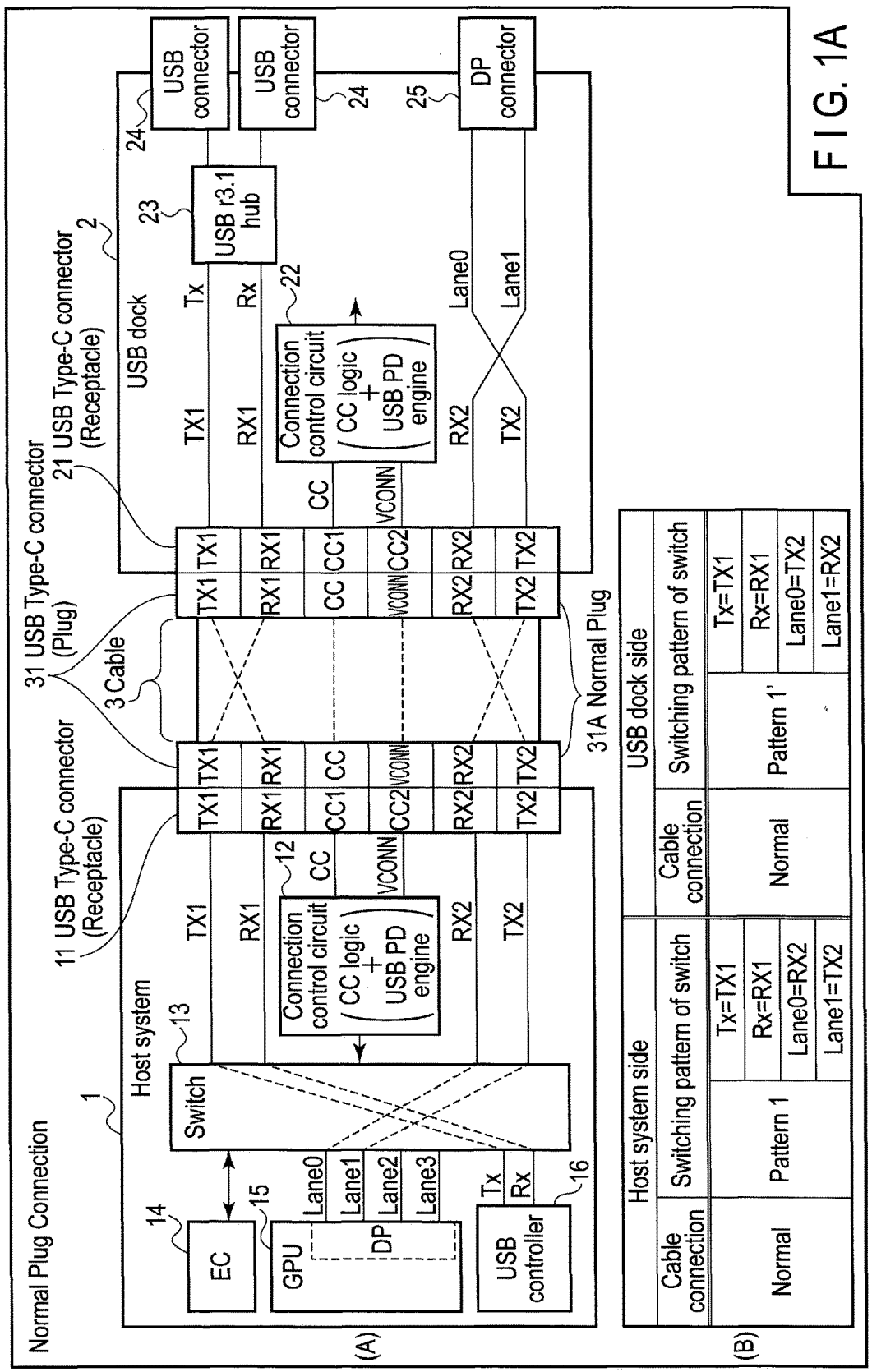
FIG. 1A is a first diagram (Normal-Normal) showing an example of a structure regarding connection by a cable conforming to the USB Type-C standard in a system of an embodiment.
Figure 1B:
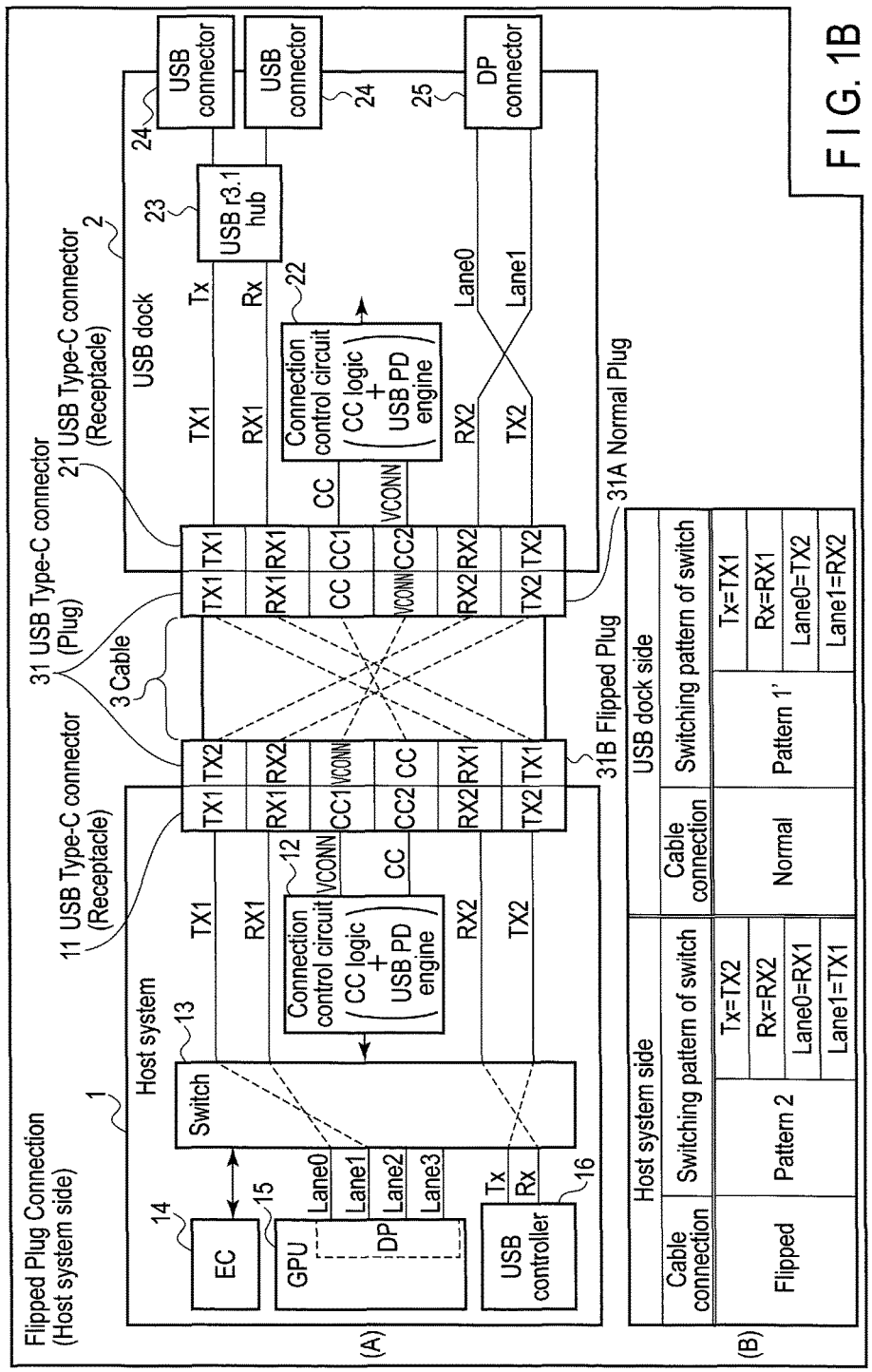
FIG. 1B is a second diagram (Flipped-Normal) showing an example of a structure regarding connection by a cable conforming to the USB Type-C standard in the system of the embodiment.
Figure 1C:
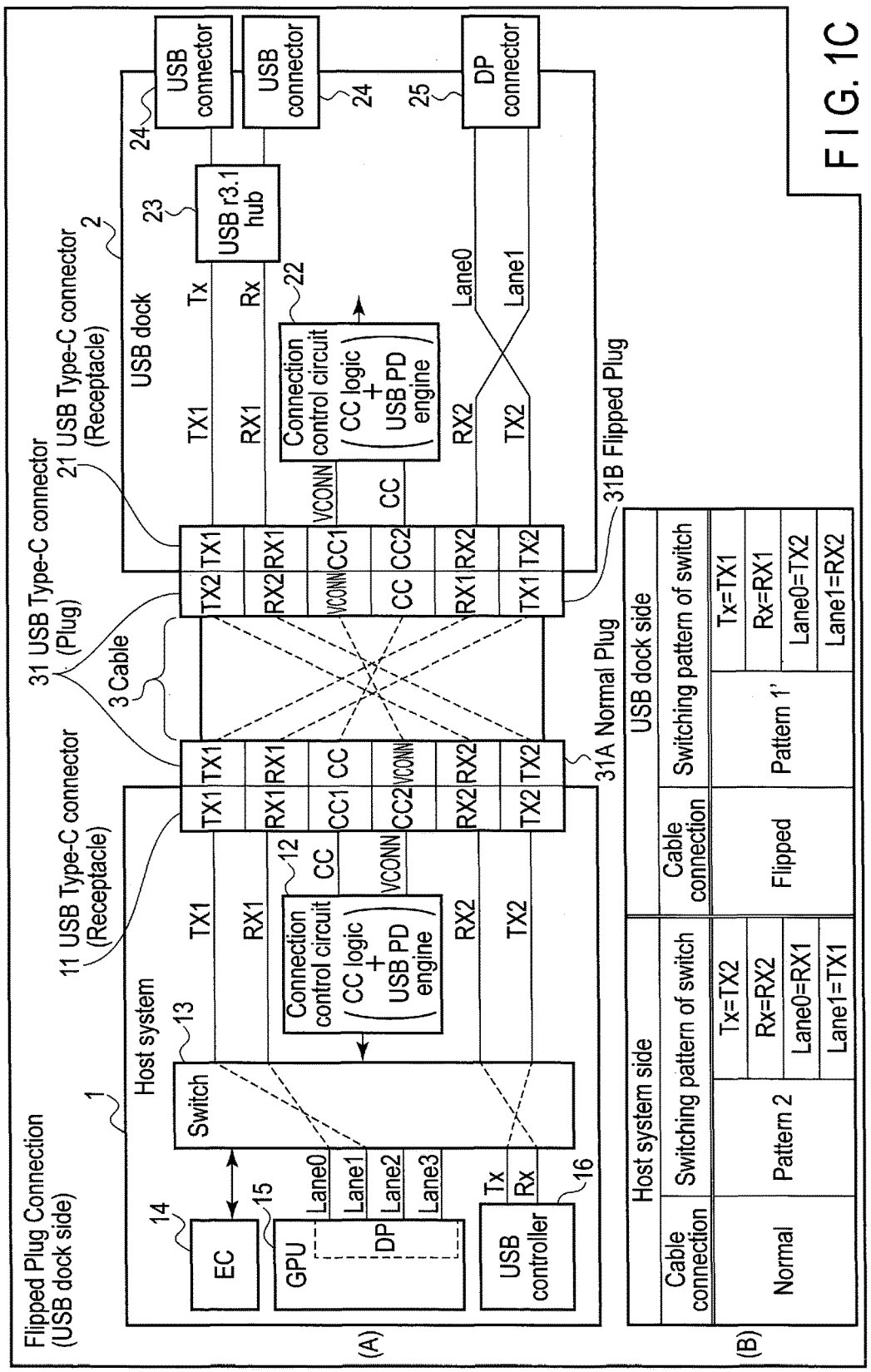
FIG. 1C is a third diagram (Normal-Flipped) showing an example of a structure regarding connection by a cable conforming to the USB Type-C standard in the system of the embodiment.
Figure 1D:
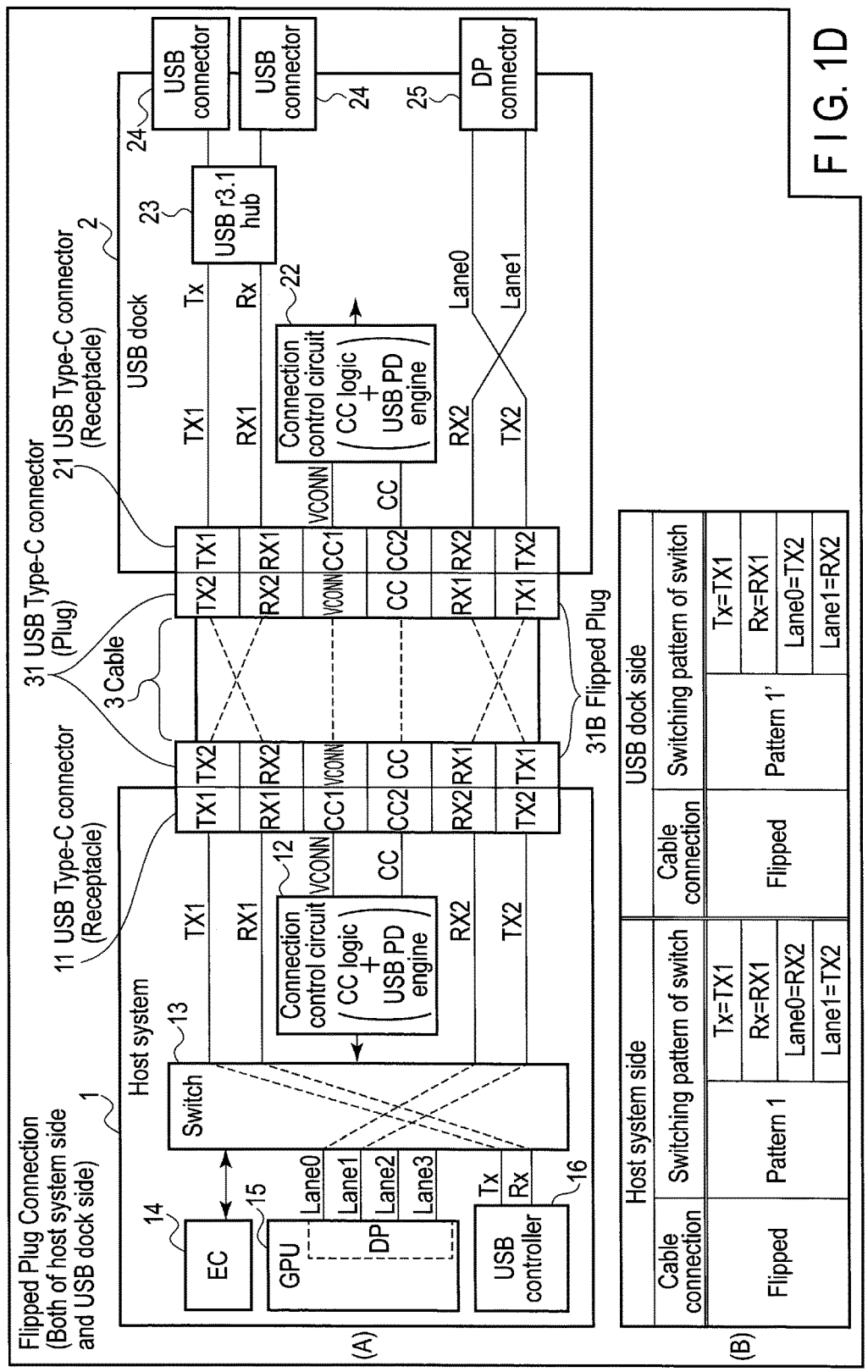
FIG. 1D is a fourth diagram (Flipped-Flipped) showing an example of a structure regarding connection by a cable conforming to the USB Type-C standard in the system of the embodiment.

The system of the present embodiment relates to a system constituted of a host system (first device) 1 and a USB doc (second device) 2. The host system 1 and the USB dock 2 are electronic devices to which the USB Type-C DisplayPort ALT Mode specification is applied, and are connected by a cable 3 conforming to the USB Type-C standard. The USB Type-C DisplayPort ALT Mode specification is the specification for diverting part of signals lines (RX2 and TX2) defined according to the USB Type-C to the DisplayPort standard data transmission and reception. As shown in FIG. 1A, the host system 1 includes a USB Type-C connector (receptacle) (second connector) 11, and the USB dock 2 also includes a USB Type-C connector (receptacle) 21. At each end (first and second ends) of the cable 3, a USB Type-C connector (plug) (first connector) 31 is provided. The USB Type-C connector (plug) 31 that is provided on one end of the cable 3 is inserted into the USB Type-C connector (receptacle) 11 of the host system 1, and the USB Type-C connector (plug) 31 that is provided on the other end of the cable 3 is inserted into the USB Type-C connector (receptacle) 21 of the USB dock 2. The USB Type-C connector (plug) 31 that is provided on one end of the cable 3 can be inserted into the USB Type-C connector (receptacle) 11 of the host system 1 in whichever orientation of normal (first state) and flipped (second state). Further, the USB Type-C connector (plug) 31 that is provided on the other end of the cable 3 can be inserted into the USB Type-C connector (receptacle) 21 of the USB dock 2 in whichever orientation of normal and flipped. In the normal/flipped connection, contact pins are arranged in point symmetry with respect to a central point of the USB Type-C connector (plug) 31 in a longitudinal direction (i.e., a vertical direction of the USB Type-C connector (plug) 31 in FIGS. 1A to 1D). FIG. 1A shows the state in which the cable 3 is connected in orientations of normal (on the host system 1 side) and normal (on the USB dock 2 side), FIG. 1B shows the state in which the cable 3 is connected in orientations of flipped (on the host system 1 side) and normal (on the USB dock 2 side), FIG. 1C shows the state in which the cable 3 is connected in orientations of normal (on the host system 1 side) and flipped (on the USB dock 2 side), and FIG. 1D shows the state in which the cable 3 is connected in orientations of flipped (on the host system 1 side) and flipped (on the USB dock 2 side).

Apart from the USB Type-C connector (receptacle) 11 described above, the host system 1 includes a connection control circuit 12 (including a first detector, a receiver and a controller), a switch 13, an embedded controller (EC) 14, a graphics processing unit (GPU) 15, and a USB controller 16.

The connection control circuit 12 is an electronic circuit comprising at least a connection configuration (CC) logic and a USB power delivery (PD) engine. The CC logic performs control for establishing a communication channel when the host system 1 and the USB dock 2 are connected by the cable 3. The CC logic can detect connection of the host system 1 and the USB dock 2 via the cable 3 by monitoring a CC1 pin and a CC2 pin, and also detect in which orientation, i.e., normal or flipped, the USB Type-C connector (plug) 31 of the cable 3 is inserted into the USB Type-C connector (receptacle) 11 of the host system 1. Further, the CC logic can execute communication using a CC signal line with a CC logic at a connection destination (i.e., a CC logic in a connection control circuit 22 to be described later of the USB dock 2). The USB PD engine performs control for supplying and receiving power via the cable 3. The side which supplies power is referred to as a source, and the side which receives the power is referred to as a sink. Here, when the host system 1 and the USB dock 2 are connected via the cable 3, it is assumed that the host system 1 is set to the source, and the USB dock 2 is set to the sink.

The switch 13 is a switch for switching allocation of the signal lines to the contact pins of the USB Type-C connector (receptacle) 11. More specifically, the switch 13 selectively applies either (a): allocation of the signal lines to the contact pins of the USB Type-C connector (receptacle) 11 that is set when the orientation of the USB Type-C connector (plug) 31 is normal or (b): allocation of the signal lines to the contact pins of the USB Type-C connector (receptacle) 11 that is set when the orientation of the USB Type-C connector (plug) 31 is flipped. The switch 13 is controlled by the connection control circuit 12 comprising the CC logic capable of detecting the orientation of the USB Type-C connector (plug) 31.

The EC 14 controls supply and interruption of power to each component in the host system 1 in cooperation with a power supply controller (PSC) not shown in FIGS. 1A to 1D. Further, the EC 14 communicates with the connection control circuit 12 equipped with the USB PD engine via an I$^2$C cable not shown in FIGS. 1A to 1D, and controls supply and interruption of power to the USB dock 2 via the cable 3.

The GPU 15 renders an image to be displayed on a display device connected to a DisplayPort (DP) connector 25 of the USB dock 2, and outputs an image signal of the image from a predetermined port (a port associated with Lane0 and Lane1) in steps conforming to the DisplayPort standard. The image signal output from the GPU 15 is guided to the USB Type-C connector (receptacle) 11 by an RX2 signal line and a TX2 signal line defined according to the USB Type-C standard via the switch 13, and is transferred to the USB dock 2 via the cable 3.

The USB controller 16 executes communication with a USB device (not shown in FIGS. 1A to 1D) connected to a USB connector 24 of the USB dock 2. The switch 13 is also involved for the communication between the USB controller 16 and the USB device in the host system 1. More specifically, by way of the switch 13, control is performed so that a Tx1 signal line and an Rx1 signal line defined according to the USB Type-C standard are used.

Apart from the above-mentioned USB Type-C connector (receptacle) 21, the USB dock 2 includes the connection control circuit 22 (including a second detector and a transmitter), a USB r3.1 hub 23, a plurality of USB connectors 24, and a DisplayPort (DP) connector 25.

The connection control circuit 22 of the USB dock 2 is also an electronic circuit comprising at least a CC logic and a USB PD engine, likewise the connection control circuit 12 of the host system 1. In other words, by the CC logic, the connection control circuit 22 can detect in which orientation, i.e., normal or flipped, the USB Type-C connector (plug) 31 of the cable 3 is inserted into the USB Type-C connector (receptacle) 21 of the USB dock 2. Further, the connection control circuit 22 can execute communication with the connection control circuit 12 of the host system 1 by the CC logic.

The USB r3.1 hub 23 performs control for sharing a single signal line (each of Tx1 and Rx1) among USB devices connected to the USB connectors 24. The USB connector 24 is a connector (receptacle) for connecting the USB device. The USB connector 24 has a shape conforming to a standard other than the USB Type-C standard whereby a connector (plug) is to be inserted in a predetermined orientation. The DP connector 25 is a connector for connecting the display device. It should be noted that although the USB dock 2 is provided with the USB Type-C connector (receptacle) 21, a switch corresponding to the switch 13 of the host system 1 is not provided.

Here, in order to facilitate understanding of the system of the present embodiment, by referring to FIGS. 2A to 2D (FIG. 2A, FIG. 2B, FIG. 2C, and FIG. 2D) first, a first comparative example will be explained. Of the constituent elements shown in FIGS. 2A to 2D, the same reference numbers are used for constituent elements that are the same as those of the system of the present embodiment for convenience.

As shown in FIG. 2A, in the first comparative example, a USB dock 2A further comprises a switch 26 corresponding to the switch 13 of a host system 1A, as compared to the USB dock 2 of the system of the present embodiment. FIG. 2A shows the state in which the cable 3 is connected in orientations of normal (on the host system 1A side) and normal (on the USB dock 2A side), FIG. 2B shows the state in which the cable 3 is connected in orientations of flipped (on the host system 1A side) and normal (on the USB dock 2A side), FIG. 2C shows the state in which the cable 3 is connected in orientations of normal (on the host system 1A side) and flipped (on the USB dock 2A side), and FIG. 2D shows the state in which the cable 3 is connected in orientations of flipped (on the host system 1A side) and flipped (on the USB dock 2A side).

Further, a connection control circuit 12A of the first comparative example controls the switch 13 by a rule different from that applied to the connection control circuit 12 of the system of the present embodiment. The rule by which the connection control circuit 12 of the system of the present embodiment controls the switch 13 will be described later.

Furthermore, likewise the connection control circuit 12 of the host system 1, a connection control circuit 22A of the first comparative example controls the switch 26, on the basis of the orientation, i.e., normal or flipped, in which the USB Type-C connector (plug) 31 of the cable 3 is inserted into the USB Type-C connector (receptacle) 21 of the USB dock 2A.

That is, in the first comparative example, each of the host system 1A and the USB dock 2A switches the allocation of the signal lines to the contact pins of the USB Type-C connector (receptacle) 11 or the USB Type-C connector (receptacle) 21, in accordance with the orientation of the USB Type-C connector (plug) 31.

More specifically, as shown in FIG. 2A, when the cable 3 is connected in orientations of normal and normal (Normal-Normal), in the host system 1A, the connection control circuit 12A controls the switch 13 such that the allocation of the signal lines to the contact pins represented as "Tx (signal line)=TX1 (contact pin)", "Rx=RX1", "Lane0=RX2", and "Lane1=TX2" is applied (hereinafter referred to as pattern 1). Meanwhile, in the USB dock 2A, the connection control circuit 22A controls the switch 26 such that the allocation represented as "Tx=TX1", "Rx=RX1", "Lane0=TX2", and "Lane1=RX2" is applied (hereinafter referred to as pattern 1').

Further, as shown in FIG. 2B, when the cable 3 is connected in orientations of flipped and normal (Flipped-Normal), in the host system 1A, the connection control circuit 12A controls the switch 13 such that the allocation represented as "Tx=TX2", "Rx=RX2", "Lane0=RX1", and "Lane1=TX1" is applied (hereinafter referred to as pattern 2). In the USB dock 2A, as in the case of orientations of normal and normal (Normal-Normal) shown in FIG. 2A, pattern 1' is applied.

As shown in FIG. 2C, when the cable 3 is connected in orientations of normal and flipped (Normal-Flipped), in the host system 1A, pattern 1 is applied as in the case of normal and normal (Normal-Normal) orientations shown in FIG. 2A. In the USB dock 2A, the connection control circuit 22A controls the switch 26 such that the allocation represented as "Tx=TX2", "Rx=RX2", "Lane0=TX1", and "Lane1=RX1" is applied (hereinafter referred to as pattern 2').

As shown in FIG. 2D, when the cable 3 is connected in orientations of flipped and flipped (Flipped-Flipped), in the host system 1A, pattern 2 is applied as in the case of flipped and normal (Flipped-Normal) orientations shown in FIG. 2B. In the USB dock 2A, as in the case of orientations of normal and flipped (Normal-Flipped) shown in FIG. 2C, pattern 2' is applied.

In other words, in the case of the first comparative example, in the host system 1A, pattern 1 is applied if the USB Type-C connector (plug) 31 of the cable 3 is inserted into the USB Type-C connector (receptacle) 11 in the normal orientation, and pattern 2 is applied if the USB Type-C connector (plug) 31 is inserted into the flipped orientation. Also, in the USB dock 2A, pattern 1' is applied if the USB Type-C connector (plug) 31 of the cable 3 is inserted into the USB Type-C connector (receptacle) 21 in the normal orientation, and pattern 2' is applied if the USB Type-C connector (plug) 31 is inserted into the flipped orientation.

In the first comparative example, the host system 1A and the USB dock 2A are equipped with the switches (13 and 26) which switch the allocation of the signal lines to the contact pins of the Type-C connectors (receptacles) (11 and 21), respectively. In other words, since the USB dock 2A also needs to be equipped with the switch 26, the first comparative example has the demerits in terms of the cost and layout.

Next, referring to FIGS. 3A and 3B, a second comparative example will be explained. Of the constituent elements shown in FIGS. 3A and 3B, the same reference numbers are used for constituent elements that are the same as those of the system of the present embodiment for convenience.

As shown in FIG. 3A, in the second comparative example, a USB dock 2B does not include a USB Type-C connector (plug) 31, as compared to the USB dock 2 of the system of the present embodiment. In other words, the USB Type-C connector (plug) 31 is deleted from the USB dock 2 of the system of the present embodiment. Further, an end of a cable 3B is connected directly and fixedly to the USB dock 2B. In other words, in the case of the second comparative example, there is no need to consider in which orientation, i.e., normal or flipped, the USB Type-C connector (plug) 31 of the cable 3B is inserted, in the USB dock 2B. Accordingly, there is no need to mount a switch 26 illustrated in FIGS. 2A to 2D related to the first comparative example. In this comparative example, it is assumed that the end of the cable 3B is connected directly and fixedly to the USB dock 2B as if the USB Type-C connector (plug) 31 of the cable 3 is inserted in the normal orientation.

A connection control circuit 12B of the second comparative example also controls the switch 13 by a rule different from that applied to the connection control circuit 12 of the system of the present embodiment. Note that the rule by which the connection control circuit 12 of the system of the present embodiment controls the switch 13 will be described later.

FIG. 3A shows the state in which the USB Type-C connector (plug) 31 of the cable 3B is inserted into the USB Type-C connector (receptacle) 11 of a host system 1B in the normal orientation, and FIG. 3B shows the state in which the USB Type-C connector (plug) 31 of the cable 3B is inserted into the USB Type-C connector (receptacle) 11 of the host system 1B in the flipped orientation.

As shown in FIG. 3A, the connection control circuit 12B of the host system 1B of the second comparative example controls the switch 13 such that pattern 1 shown in FIGS. 2A and 2C of the first comparative example is applied, if the USB Type-C connector (plug) 31 of the cable 3B is inserted into the USB Type-C connector (receptacle) 11 in the normal orientation. In the second comparative example, only one connector (plug), which is the USB Type-C connector (plug) 31 of the cable 3B to be inserted into the USB Type-C connector (receptacle) 11 of the host system 1B, is provided. Therefore, the signal lines in the USB dock 2B are assumed to be allocated to the contact pins of the USB Type-C connector (plug) 31 inserted into the USB Type-C connector (receptacle) 11. More specifically, the allocation is represented as "Tx=RX1", "Rx=TX1", "Lane0=RX2", and "Lane1=TX2", which will be hereinafter referred to as pattern 3.

As shown in FIG. 3B, if the USB Type-C connector (plug) 31 of the cable 3B is inserted into the USB Type-C connector (receptacle) 11 in the flipped orientation, the connection control circuit 12B of the host system 1B of the second comparative example controls the switch 13 such that pattern 2 shown in FIGS. 2B and 2D related to the first comparative example is applied. Needless to say, pattern 3 is applied in the USB dock 2B.

In the second comparative example, as compared to the first comparative example, the USB Type-C connector (receptacle) 21 can be deleted from the USB dock 2B, and the switch 26 can also be deleted. Accordingly, the second comparative example has the merit in terms of the cost and layout. However, the form that the cable 3B extends from the USB dock 2B may decrease the convenience as the storage or carrying becomes inconvenient. Further, because the cable 3B is not removed from the USB dock 2B when it is caught on something, safety may be lowered.

Returning to FIG. 1A, the system of the present embodiment will be continued to be explained based on the above first comparative example and second comparative example.

As described above, the connection control circuit 12 of the host system 1 can detect in which orientation i.e., normal or flipped, the USB Type-C connector (plug) 31 of the cable 3 is inserted into the USB Type-C connector (receptacle) 11 of the host system 1. Also, the connection control circuit 22 of the USB dock 2 can detect in which orientation i.e., normal or flipped, the USB Type-C connector (plug) 31 of the cable 3 is inserted into the USB Type-C connector (receptacle) 21 of the USB dock 2. Further, the connection control circuit 12 of the host system 1 and the connection control circuit 22 of the USB dock 2 can communicate with each other.

Thus, in the system of the present embodiment, the connection control circuit 22 of the USB dock 2 transmits, to the connection control circuit 12 of the host system 1, information regarding the detected orientation of the USB Type-C connector (plug) 31 on the USB dock 2 side, as status information. The connection control circuit 12 of the host system 1 controls the switch 13, based on both of the detected orientation of the USB Type-C connector (plug) 31 on the host system 1 side, and the orientation of the USB Type-C connector (plug) 31 on the USB dock 2 side, corresponding to information received as the status information from the connection control circuit 22 of the USB dock 2. Here, as shown in FIGS. 1A to 1D, it is assumed that pattern 1' shown in FIGS. 2A and 2B related to the first comparative example is fixedly applied at the USB dock 2 side.

As shown in FIG. 1A, when the cable 3 is connected in orientations of normal and normal (Normal-Normal), the connection control circuit 12 of the host system 1 controls the switch 13 such that the signal lines are allocated as shown in FIG. 2A of the first comparative example, more specifically, pattern 1 is applied.

As shown in FIG. 1B, when the cable 3 is connected in orientations of flipped and normal (Flipped-Normal), the connection control circuit 12 of the host system 1 controls the switch 13 such that the signal lines are allocated as shown in FIG. 2B of the first comparative example, more specifically, pattern 2 is applied.

As shown in FIG. 1C, when the cable 3 is connected in orientations of normal and flipped (Normal-Flipped), the connection control circuit 12 of the host system 1 controls the switch 13 such that the signal lines are allocated as shown in FIG. 2B of the first comparative example, more specifically, pattern 2 is applied, although the host system 1 side corresponds to the normal orientation.

As shown in FIG. 1D, when the cable 3 is connected in orientations of flipped and flipped (Flipped-Flipped), the connection control circuit 12 of the host system 1 controls the switch 13 such that the signal lines are allocated as shown in FIG. 2A of the first comparative example, more specifically, pattern 1 is applied, although the host system 1 side corresponds to the flipped orientation.

In other words, the connection control circuit 12 of the host system 1 controls the switch 13 such that pattern 1, which is set when the orientation of the USB Type-C connector (plug) 31 is normal, is applied in a case where the orientation of the USB Type-C connector (plug) 31 of the host system 1 side matches with the orientation of the USB Type-C connector (plug) 31 on the USB dock 2 side, and such that pattern 2, which is set when the orientation of the USB Type-C connector (plug) 31 is flipped, is applied in a case where the orientation of the USB Type-C connector (plug) 31 of the host system 1 side does not match with the orientation of the USB Type-C connector (plug) 31 on the USB dock 2 side.

As described above, in the system of the present embodiment, the connection control circuit 12 of the host system 1 detects the orientation of the USB Type-C connector (plug) 31 of the host system 1 side, and also acquires information regarding the orientation of the USB Type-C connector (plug) 31 of the USB dock 2 side from the connection control circuit 22 of the USB dock 2. Further, by controlling the switch 13 based on both the orientation of the USB Type-C connector (plug) 31 of the host system 1 side and the orientation of the USB Type-C connector (plug) 31 of the USB dock 2 side, the switch 26 that was required in the first comparative example can be eliminated from the USB dock 2 comprising the USB Type-C connector (receptacle) 21.

In other words, in the system of the present embodiment, a switch for signal switching can be omitted in one of the two electronic devices without impairing the convenience and safety.

FIG. 4 shows, as a list, a summary of switching patterns of each of the switches (13 and 26) in the system of the present embodiment (A), the first comparative example (B), and the second comparative example (C).

Further, in the explanation given above of the system of the present embodiment, it is assumed that pattern 1' shown in FIGS. 2A and 2B of the first comparative example is fixedly applied at the USB dock 2 side. However, not limited to the above, pattern 2' shown in FIGS. 2C and 2D related to the first comparative example may be fixedly applied at the USB dock 2 side. FIG. 5 shows switching patterns of the switch 13 of the system of the present embodiment in this case.

In other words, when the cable 3 is connected in orientations of normal and normal (Normal-Normal), the connection control circuit 12 of the host system 1 controls the switch 13 such that the signal lines are allocated as shown in FIG. 2D related to the first comparative example, more specifically, pattern 2 is applied, although the host system 1 side corresponds to the normal orientation.

Further, when the cable 3 is connected in orientations of flipped and normal (Flipped-Normal), the connection control circuit 12 of the host system 1 controls the switch 13 such that the signal lines are allocated as shown in FIG. 2C related to the first comparative example, more specifically, pattern 1 is applied, although the host system 1 side corresponds to the flipped orientation.

When the cable 3 is connected in orientations of normal and flipped (Normal-Flipped), the connection control circuit 12 of the host system 1 controls the switch 13 such that the signal lines are allocated as shown in FIG. 2C related to the first comparative example, more specifically, pattern 1 is applied.

When the cable 3 is connected in orientations of flipped and flipped (Flipped-Flipped), the connection control circuit 12 of the host system 1 controls the switch 13 such that the signal lines are allocated as shown in FIG. 2D related to the first comparative example, more specifically, pattern 2 is applied.

Figure 6:
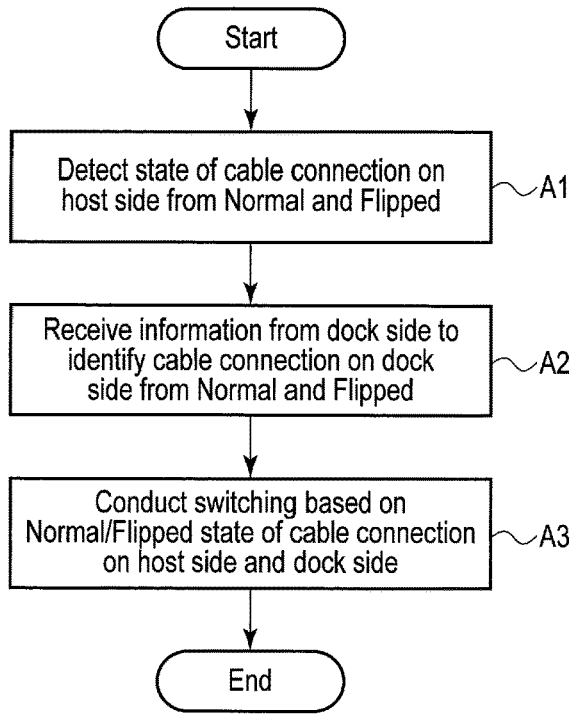
FIG. 6 is a flowchart showing an operation procedure of a host system (a connection control circuit) of the system of the embodiment.

FIG. 6 is a flowchart showing an operation procedure of the host system 1 (the connection control circuit 12) of the system of the present embodiment.

The connection control circuit 12 of the host system 1 detects in which orientation, i.e., normal or flipped, the USB Type-C connector (plug) 31 of the cable 3 is inserted into the USB Type-C connector (receptacle) 11 of the host system 1 (step A1).

Further, the connection control circuit 12 of the host system 1 receives information as to which of a normal orientation and a flipped orientation the USB Type-C connector (plug) 31 of the cable 3 is inserted into the USB Type-C connector (receptacle) 21 of the USB dock 2 from the connection control circuit 22 of the USB dock 2 (step A2). Note that steps A1 and A2 may be executed in parallel or executed by exchanging the order of steps.

Further, the connection control circuit 12 of the host system 1 controls the switch 13, based on both of the detected orientation of the USB Type-C connector (plug) 31 on the host system 1 side, and the orientation of the USB Type-C connector (plug) 31 on the USB dock 2 side (information of the orientation is received from the connection control circuit 22 of the USB dock 2) (step A3).

Figure 7:
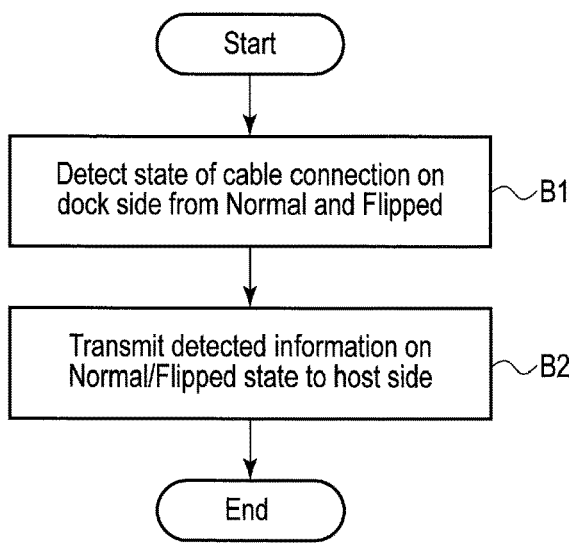
FIG. 7 is a flowchart showing an operation procedure of a USB dock (a connection control circuit) of the system of the embodiment.

FIG. 7 is a flowchart showing an operation procedure of the USB dock 2 (the connection control circuit 22) of the system of the present embodiment.

The connection control circuit 22 of the USB dock 2 detects in which orientation, i.e., normal or flipped, the USB Type-C connector (plug) 31 of the cable 3 is inserted into the USB Type-C connector (receptacle) 21 of the USB dock 2 (step B1).

Further, the connection control circuit 22 of the USB dock 2 transmits, to the connection control circuit 12 of the host system 1, information regarding the detected orientation of the USB Type-C connector (plug) 31 on the USB dock 2 side (step B2).

As described above, in the system of the present embodiment, omitting a switch for signal switching can be realized in one of the two electronic devices without impairing the convenience and safety.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A system comprising:
a first device having a first receptacle;
a second device having a second receptacle; and
a cable that connects the first device and the second device and that comprises a first connector that connects to the first receptacle of the first device at one end of the cable and a second connector that connects to the second receptacle of the second device at another end of the cable, each of the first connector and the second connector being a point-symmetrical configuration, four connection states including a normal-normal state, a flipped-normal state, a normal-flipped state and a flipped-flipped state being applicable to a connection state of the first receptacle and the first connector and a connection state of the second receptacle and the second connector, wherein
the second device comprises a second controller that detects whether the connection state of the second receptacle and the second connector is a normal state or a flipped state and transmits a result of the detection as status information to the first device via the cable,
the first device comprises:
a switch that switches allocation of a plurality of signal lines to a plurality of contact pins of the first receptacle; and
a first controller that detects whether the connection state of the first receptacle and the first connector is a normal state or a flipped state, and determines one of the four connection states based on a result of the determination and the status information to control the switch.

2. The system of claim 1, wherein,
in the second device, the plurality of signal lines are allocated fixedly to a plurality of contact pins of the second receptacle.

3. The system of claim 2, wherein,
in the second device, allocation of the plurality of signal lines to the plurality of contact pins of the second receptacle that is set when the second receptacle and the second connector are connected in the normal state is applied fixedly,
the switch of the first device applies one of a first pattern and a second pattern with respect to a connection pattern of the plurality of signal lines to the plurality of contact pins of the first receptacle, the first pattern being applied when the cable is in a normal orientation, the second pattern being applied when the cable is in a flipped orientation, and
the first controller of the first device
controls the switch such that the first pattern is applied, when the first controller detects that the connection state of the first receptacle and the first connector is the normal state, and the status information indicates that the connection state of the second receptacle and the second connector is the normal state,
controls the switch such that the second pattern is applied, when the first controller detects that the connection state of the first receptacle and the first connector is the flipped state, and the status information indicates that the connection state of the second receptacle and the second connector is the normal state,
controls the switch such that the second pattern is applied, when the first controller detects that the connection state of the first receptacle and the first connector is the normal state, and the status information indicates that the connection state of the second receptacle and the second connector is the flipped state, and
controls the switch such that the first pattern is applied, when the first controller detects that the connection state of the first receptacle and the first connector is the flipped state, and the status information indicates that the connection state of the second receptacle and the second connector is the flipped state.

4. The system of claim 2, wherein,
in the second device, allocation of the plurality of signal lines to the plurality of contact pins of the second receptacle that is set when the second receptacle and the second connector are connected in the flipped state is applied fixedly,
the switch of the first device applies one of a first pattern and a second pattern with respect to a connection pattern of the plurality of signal lines to the plurality of contact pins of the first receptacle, the first pattern being applied when the cable is in a normal orientation, the second pattern being applied when the cable is in a flipped orientation, and
the first controller of the first device
controls the switch such that the second pattern is applied, when the first controller detects that the connection state of the first receptacle and the first connector is the normal state, and the status information indicates that the connection state of the second receptacle and the second connector is the normal state,
controls the switch such that the first pattern is applied, when the first controller detects that the connection state of the first receptacle and the first connector is the flipped state, and the status information indicates that the connection state of the second receptacle and the second connector is the normal state,
controls the switch such that the first pattern is applied, when the first controller detects that the connection state of the first receptacle and the first connector is the normal state, and the status information indicates that the connection state of the second receptacle and the second connector is the flipped state, and
controls the switch such that the second pattern is applied, when the first controller detects that the connection state of the first receptacle and the first connector is the flipped state, and the status information indicates that the connection state of the second receptacle and the second connector is the flipped state.

5. The system of claim 1, wherein
the cable comprises a cable conforming to a USB (universal serial bus) Type-C standard.

6. The system of claim 5, wherein
the first connector and the second connector each comprise a plug.

7. An electronic device having a first receptacle and being connectable to an external device having a second receptacle via a cable, wherein
the cable comprises a first connector that connects to the first receptacle at one end of the cable and a second connector that connects to the second receptacle at another end of the cable, each of the first connector and the second connector being a point-symmetrical configuration, four connection states including a normal-normal state, a flipped-normal state, a normal-flipped state and a flipped-flipped state being applicable to a connection state of the first receptacle and the first connector and a connection state of the second receptacle and the second connector,
the electronic device further comprises:
a switch that switches allocation of a plurality of signal lines to a plurality of contact pins of the first receptacle; and
a controller that detects whether the connection state of the first receptacle and the first connector is a normal state or a flipped state, and determines one of the four connection states based on a result of the determination and status information transmitted from the external device to control the switch, the status information indicative of whether the connection state of the second receptacle and the second connector is a normal state or a flipped state.

8. The electronic device of claim 7, wherein,
in the external device, allocation of the plurality of signal lines to a plurality of contact pins of the second receptacle that is set when the second receptacle and the second connector are connected in the normal state is applied fixedly, the switch applies one of a first pattern and a second pattern with respect to a connection pattern of the plurality of signal lines to the plurality of contact pins of the first receptacle, the first pattern being applied when the cable is in a normal orientation, the second pattern being applied when the cable is in an flipped orientation, and the controller controls the switch such that the first pattern is applied, when the controller detects that the connection state of the first receptacle and the first connector is the normal state, and the status information indicates that the connection state of the second receptacle and the second connector is the normal state, controls the switch such that the second pattern is applied, when the controller detects that the connection state of the first receptacle and the first connector is the flipped state, and the status information indicates that the connection state of the second receptacle and the second connector is the normal state, controls the switch such that the second pattern is applied, when the controller detects that the connection state of the first receptacle and the first connector is the normal state, and the status information indicates that the connection state of the second receptacle and the second connector is the flipped state, and controls the switch such that the first pattern is applied, when the controller detects that the connection state of the first receptacle and the first connector is the flipped state, and the status information indicates that the connection state of the second receptacle and the second connector is the flipped state.

9. The electronic device of claim 7, wherein, in the external device, allocation of the plurality of signal lines to a plurality of contact pins of the second receptacle that is set when the second receptacle and the second connector are connected in the flipped state is applied fixedly, the switch of the first device applies one of a first pattern and a second pattern with respect to a connection pattern of the plurality of signal lines to the plurality of contact pins of the first receptacle, the first pattern being applied when the cable is in a normal orientation, the second pattern being applied when the cable is in a flipped orientation, and the controller controls the switch such that the second pattern is applied, when the controller detects that the connection state of the first receptacle and the first connector is the normal state, and the status information indicates that the connection state of the second receptacle and the second connector is the normal state, controls the switch such that the first pattern is applied, when the controller detects that the connection state of the first receptacle and the first connector is the flipped state, and the status information indicates that the connection state of the second receptacle and the second connector is the normal state, controls the switch such that the first pattern is applied, when the controller detects that the connection state of the first receptacle and the first connector is the normal state, and the status information indicates that the connection state of the second receptacle and the second connector is the flipped state, and controls the switch such that the second pattern is applied, when the first controller detects that the connection state of the first receptacle and the first connector is the flipped state, and the status information indicates that the connection state of the second receptacle and the second connector is the flipped state.

10. The electronic device of claim 7, wherein the cable comprises a cable conforming to a USB (universal serial bus) Type-C standard.

11. The electronic device of claim 10, wherein the first connector and the second connector each comprise a plug.

12. A method for controlling connection of a system in which a first device having a first receptacle and a second device having a second receptacle are connected via a cable, the cable comprising a first connector that connects to the first receptacle at one end of the cable and a second connector that connects to the second receptacle at another end of the cable, each of the first connector and the second connector being a point-symmetrical configuration, four connection states including a normal-normal state, a flipped-normal state, a normal-flipped state and a flipped-flipped state being applicable to a connection state of the first receptacle and the first connector and a connection state of the second receptacle and the second connector, the method comprising:

in the second device, detecting whether the connection state of the second receptacle and the second connector is a normal state or a flipped state and transmitting a result of the detection as status information to the first device via the cable, in the first device, detecting whether the connection state of the first receptacle and the first connector is the normal state or the flipped state;

receiving, from the second device via the cable, the status information indicative of whether the connection state of the second receptacle and the second connector is the normal state or the flipped state;

determining one of the four connection states based on a result of the detection of the connection state of the first receptacle and the first connector and the received the status information; and switching allocation of a plurality of signal lines to a plurality of contact pins of the first receptacle, by a switch located between the plurality of contact pins of the first receptacle and the plurality of signal lines, based on the determination of the connection state.

13. The method of claim 12, the method further comprising:

in the second device, fixedly applying allocation of the plurality of signal lines to a plurality of contact pins of the second receptacle that is set when the second receptacle and the second connector are connected in the normal state;

the switch of the first device applying one of a first pattern and a second pattern with respect to a connection pattern of the plurality of signal lines to the plurality of contact pins of the first receptacle, the first pattern being applied when the cable is in a normal orientation, the second pattern being applied when the cable is in a flipped orientation, and in the first device, controlling the switch such that the first pattern is applied, when the first device detects that the connection state of the first receptacle and the first connector is the normal state, and the status information indicates that the connection state of the second receptacle and the second connector is the normal state;

controlling the switch such that the second pattern is applied, when the first device detects that the connection state of the first receptacle and the first connector is the flipped state, and the status information indicates that the connection state of the second receptacle and the second connector is the normal state;

controlling the switch such that the second pattern is applied, when the first device detects that the connection state of the first receptacle and the first connector is the normal state, and the status information indicates that the connection state of the second receptacle and the second connector is the flipped state; and controlling the switch such that the first pattern is applied, when the first device detects that the connection state of the first receptacle and the first connector is the flipped state, and the status information indicates that the connection state of the second receptacle and the second connector is the flipped state.

14. The method of claim 12, the method further comprising:

in the second device, fixedly applying allocation of the plurality of signal lines to a plurality of contact pins of the second receptacle that is set when the second receptacle and the second connector are connected in the flipped state;

the switch of the first device applying one of a first pattern and a second pattern with respect to a connection pattern of the plurality of signal lines to a plurality of contact pins of the first receptacle, the first pattern being applied when the cable is in a normal orientation, the second pattern being applied when the cable is in a flipped orientation, and in the first device, controlling the switch such that the second pattern is applied, when the first device detects that the connection state of the first receptacle and the first connector is the normal state, and the status information indicates that the connection state of the second receptacle and the connector is the normal state;

controlling the switch such that the first pattern is applied, when the first device detects that the connection state of the first receptacle and the first connector is the flipped state, and the status information indicates that the connection state of the second receptacle and the second connector is the normal state;

controlling the switch such that the first pattern is applied, when the first device detects that the connection state of the first receptacle and the first connector is the normal state, and the status information indicates that the connection state of the second receptacle and the second connector is the flipped state; and controlling the switch such that the second pattern is applied, when the first device detects that the connection state of the first receptacle and the first connector is the flipped state, and the status information indicates that the connection state of the second receptacle and the second connector is the flipped state.

* * * * *